Sept. 22, 1970      R. L. HIRSCH      3,530,036

APPARATUS FOR GENERATING FUSION REACTIONS

Filed Dec. 15, 1967      7 Sheets-Sheet 1

INVENTOR
ROBERT L. HIRSCH,
BY Hood, Gust & Irish
ATTORNEYS.

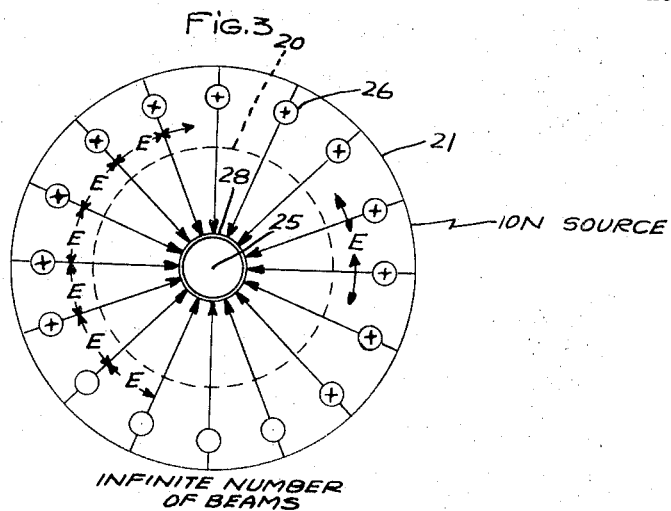
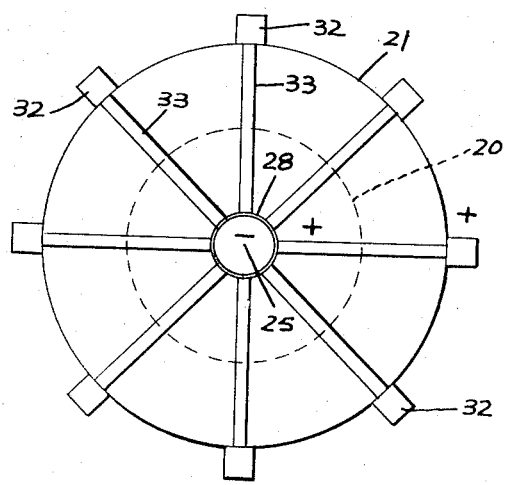
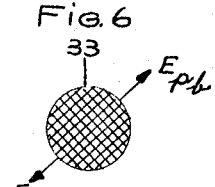
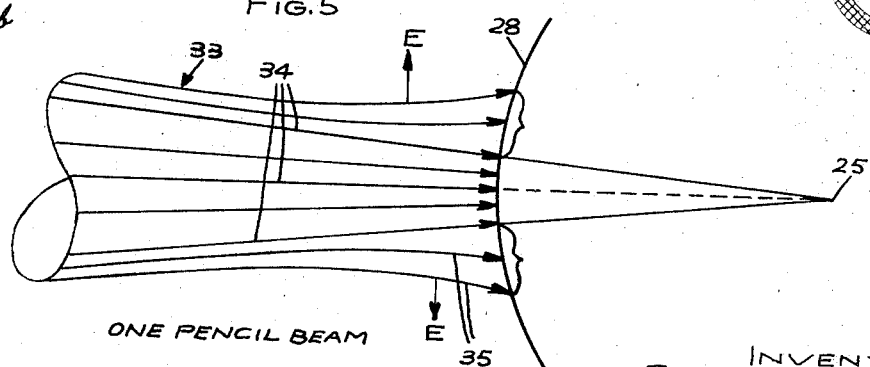

Sept. 22, 1970 R. L. HIRSCH 3,530,036
APPARATUS FOR GENERATING FUSION REACTIONS
Filed Dec. 15, 1967 7 Sheets-Sheet 3

INVENTOR:
ROBERT L. HIRSCH,
BY Hood, Gust & Irish
ATTORNEYS.

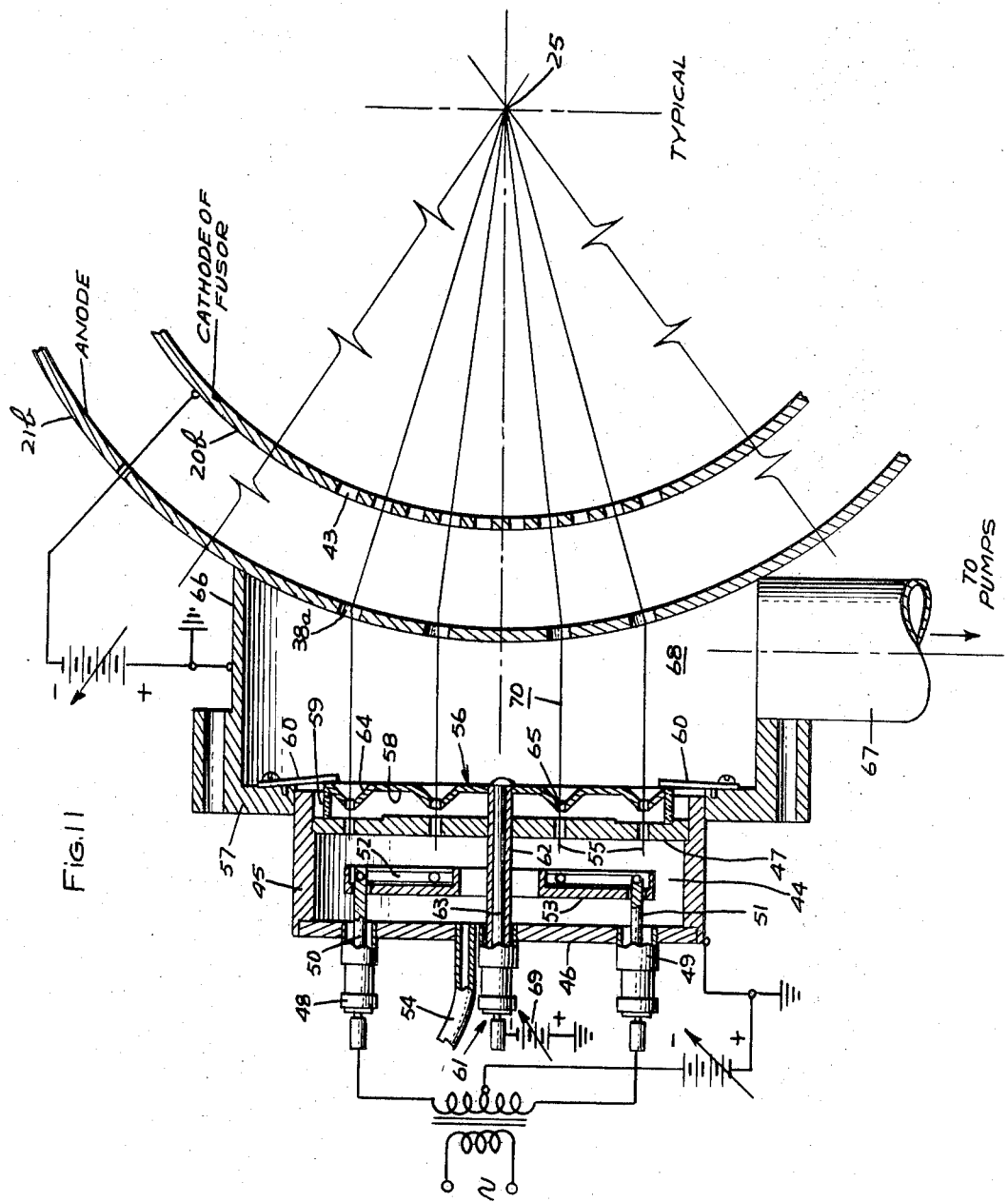

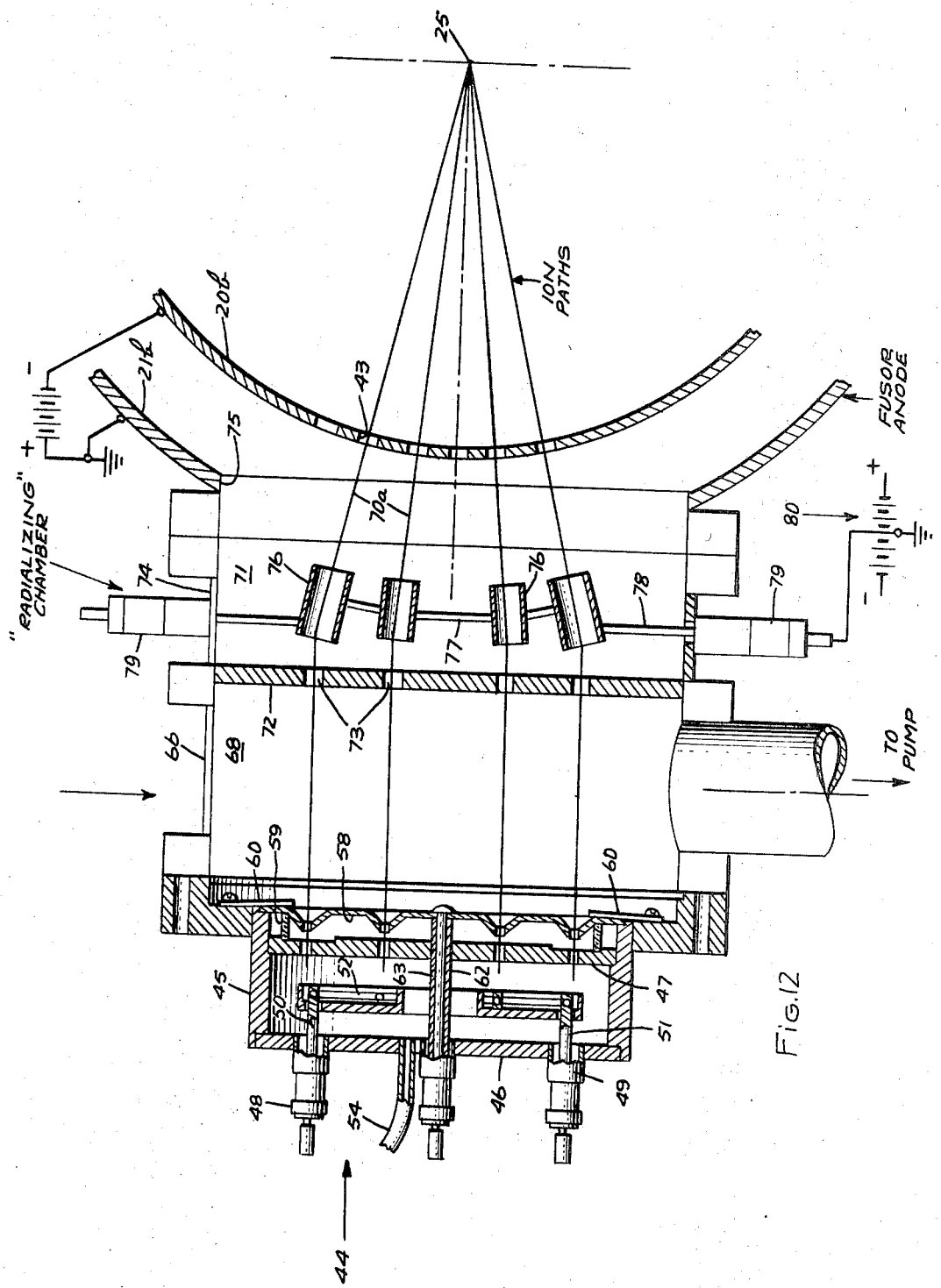

United States Patent Office
3,530,036
Patented Sept. 22, 1970

3,530,036
APPARATUS FOR GENERATING FUSION REACTIONS
Robert L. Hirsch, Fort Wayne, Ind., assignor to International Telephone and Telegraph Corporation, Nutley, N.J., a corporation of Maryland
Filed Dec. 15, 1967, Ser. No. 691,049
Int. Cl. G21b 1/02
U.S. Cl. 176—1     10 Claims

ABSTRACT OF THE DISCLOSURE

Apparatus for generating fusion reactions comprising a generally spherical anode which has concentrically positioned therein a generally spherical cathode permeable to charged particle flow. The cathode is hollow and defines a volume centrally located with respect to both the anode and the cathode. This volume is free of tangible structure. A fusion-reactive gas is contained within the volume. A plurality of ion-producing devices are mounted on the exterior of the anode and are spherically spaced and diametrically aligned in pairs. Each ion-producing device is provided with a drift chamber, interposed between a plasma region and the anode, for receiving ions. Focusing electrodes may be contained within each ion-producing device which, in cooperation with both the anode and cathode, serve to accelerate ions toward the center of the cathode volume along paths which are essentially radial.

BACKGROUND OF THE INVENTION

Field of the invention

This invention relates to apparatus for producing nuclear-fusion reactions, and more particularly to apparatus for producing controlled nuclear-fusion reactions with greater efficiency than has heretofore been achieved in similar apparatuses.

Description of the prior art

In Farnsworth Pat. No. 3,258,402, issued June 28, 1966, as well as Farnsworth Pat. No. 3,386,883, issued on June 4, 1968, in application Ser. No. 549,849, filed May 13, 1966, there are disclosed methods and apparatuses of the character with which the present invention is concerned, capable of producing continuous fusion reactions. Generally speaking, the apparatuses of these prior patents utilize a spherical geometry in which two generally spherical electrodes, one a cathode and the other an anode, are concentrically positioned with one inside the other. The cathode is electron-emissive in one embodiment of the aforesaid patents and is concentrically surrounded by a shell-like anode. The cathode is permeable to the flow of ions, while the anode is not. In operation, an electrical discharge, composed of high-order of magnitude electron and ion currents in the space enveloped by the cathode, produces a radial potential distribution which, generally speaking, is a minimum adjacent to the center of the cathode cavity and a maximum outwardly therefrom, the location of one such maximum being adjacent to the anode wall. Developed at a finite radius intermediate the center and the cathode wall is a "virtual anode" in the form of a spherical sheath. The potential of this virtual anode is essentially equal to that of the structural anode, thereby resulting in the entrapment of ions within the virtual anode sheath. By reason of electron emission from the cathode, the potential minimum is formed at the center, which results in the trapped ions oscillating through the center. With a sufficiently high difference of potential between the virtual anode and the center, the trapped ions will be propelled at nuclear-reacting energies, so that ion collisions occurring at the center produce nuclear-fusion reactions.

The ions of the bipolar charges which are utilized for generating the aforesaid virtual electrodes as well as the fusion reactions, in the apparatus of the aforesaid Farnsworth Pat. No. 3,258,402, are obtained in one instance by ionizing neutral gas introduced directly into the anode itself and in another instance by means of ion guns located on the outermost of the anode and cathode, these ion guns each producing a pencil-like, solid, cross-section beam which is aimed at the center of the device. In Farnsworth Pat. No. 3,386,883, mentioned hereinbefore, the source of the ions is generally confined to ion guns mounted on the exterior of the anode having a cathode thereinside. These ion guns also produce beams of concentrated, pencil-like configuration of solid cross-section.

Experimental evidence has shown that the more nearly radial the ion motions, the more efficient will be the utilization of the ions in producing fusion reactions. Ions not so reacting will represent a power loss. It has been found that space charge spreading in the pencil ion-beams mentioned hereinbefore produced a significant number of non-radial ions, thereby resulting in less than maximum utilization of the total number of injected ions and a reduction in ion-trapping efficiency.

Further experimental evidence indicates that ionization of neutral gas within the anode as the source of sheath-forming ions is inefficient an dis random in character.

SUMMARY OF THE INVENTION

In accordance with the broader aspects of this invention, there is provided an apparatus (sometimes referred to as a "fusor") for generating fusion reactions in which a spherical anode concentrically envelopes a spherical cathode which in turn encloses a volume free of tangible structure. The cathode is permeable to the flow of positively charged particles therethrough but is substantially impervious to the flow of electrons. Means are provided for applying a potential to the anode and cathode for establishing an electric field of high order magnitude therebetween. Ionization devices provided on the exterior of the anode serve to inject an ionized, fusion-reactive gas into the anode in a region of the latter corresponding to an extended area, spherical segment thereof. In other words, instead of the ions being injected into the anode in a form corresponding to an ion beam of solid cross-section, this beam being of pencil-like formation, they are injected over an extended area of the anode sphere many times the cross-sectional area of the pencil-like beam. This extended area injection will be characterized hereinafter as a "localized distributed source." The ion-producing device includes a drift chamber, a vacuum pump being connected to the drift chamber for scavenging neutral gas therefrom. Electrode means including the anode and cathode are provided for focusing the ionized particles from the drift chamber into the anode toward the center of the cathodic volume, it being the objective that the focused ions follow essentially radial paths whereby a maximum number of ions will reach the center where the fusion probability is highest.

It is an object of this invention to provide apparatus for producing nuclear fusion reactions with greater efficiency than has heretofore been achieved in similar apparatuses.

It is another object of this invention to provide an apparatus for producing fusion reactions in which ion streams emanating from spherically spaced sources and crossing at a common intersection follow more nearly radial paths than has been true in prior art apparatuses of the same character.

It is still another object to provide fusion-producing apparatus which utilizes greater numbers of ions in the generation of fusion reactions than heretofore has been achieved in similar apparatuses.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a diagram used in explaining the theory of a distributed ion source in connection with the formation of a virtual anode;

FIGS. 4 and 5 are diagrams used in explaining the space charge effects encountered in the use of ion beams of pencil-like form;

FIGS. 6 and 7 are cross-sections of pencil-like and hollow beams and are used in explaining the theory of this invention;

FIG. 11 is a similar sectional view of yet another embodiment of this invention; and FIG. 12 is a similar sectional view of still a further embodiment of this invention.

DESCRIPTION OF THE PREFERRED EMBODIMENT

Figure 1:
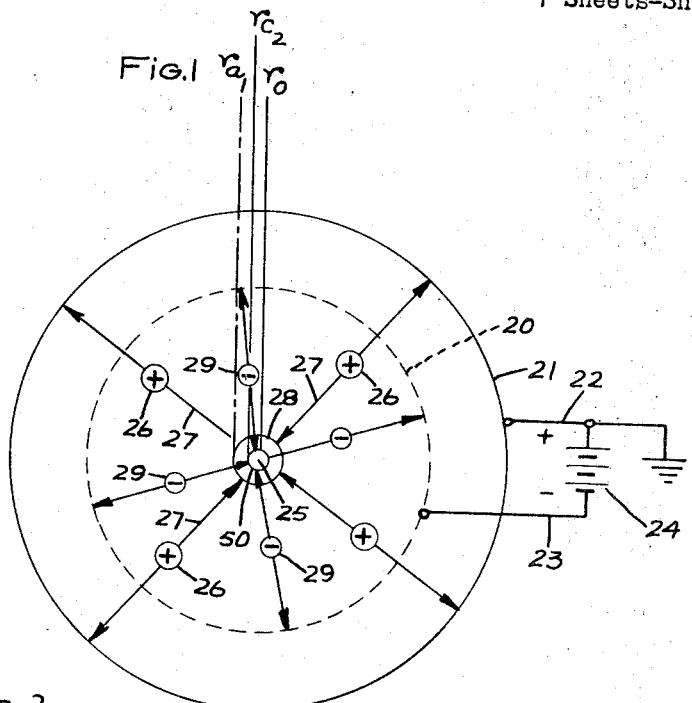
FIG. 1 is a diagrammatic illustration of a conceptual embodiment of the present invention used in explaining the theory of operation.

Involved in this invention is a non-magnetic method for the confinement of ionized fusion gases and the utilization of this phenomenon for the construction of a controlled nuclear-fusion reactor as diagrammatically illustrated in FIG. 1. An ion-permeable spherical cathode 20 is surrounded by a uniformly ion-emitting spherical anode 21. The cathode 20 is assumed to be electron-emissive on its interior surface and is impermeable to electron flow. With no electron emission and perfectly radial motions, ions from the anode 21 will be accelerated into the cathode 20 where mutual repulsion therebetween will cause them to be decelerated and brought to rest at some radius $r_{a1}$. They will then be accelerated radially outward. After passing through the cathode, they will again be brought to rest at the anode 21. Since ions are emitted radially outward from radius $r_{a1}$, the concentration of ions at that position can properly be referred to as a virtual anode.

More particularly, FIG. 1 illustrates an evacuated spherical electron-tube structure in which the cathode 20 may be considered as an open-mesh electrode formed of metallic screen or the like, which is electron emissive and preferably controlled by external means. The anode 21 may be considered as a solid metallic shell impervious to the flow of gas. Suitable electrical connections are made to the electrodes 20 and 21, a lead 22 being connected to the anode 21 for applying a positive potential thereto and another lead 23 to the cathode 20 for connection to the negative terminal of a power source such as a battery 24. In the preferred embodiment of this invention, the anode 21 is operated at ground potential.

In one embodiment of this invention, ions of a suitable nuclear-fusion reactive gas are introduced into the space enclosed by the cathode 20. An electrical discharge composed of high-magnitude electron and ion currents forms in the volume inside the cathode and develops a difference of potential which is adjusted so as to obtain a minimum near the geometric center 25 and a maximum adjacent to the anode 21, with one or more potential maxima (virtual anodes) and minima (virtual cathodes) concentrically enclosed within the cathode 20. Energetic ions, falling inwardly toward the center 25 from regions of high potentials, will be propelled at velocities (energies) which are sufficient to overcome the repelling forces of the slower (target) ions born in the region near the center 25 and collide, thus producing nuclear-fusion reactions.

Ions emitted generally and uniformly from the inner surface of the anode 21 are indicated by the numeral 26 as following the radial paths of the respective arrows 27 to the inner boundary of the virtual anode at the radius $r_{a1}$. The circle 28 concentrically surrounding the center 25 indicates the size and location of the virtual anode.

Next consider the emission of electrons from the cathode 20. Such electrons are indicated by the numeral 29. They are accelerated by the virtual anode 28 and pass through it toward the center 25. Once inside the virtual anode, their mutual repulsion will decelerate them until they come to rest at some radius $r_{c2}$ (less than $r_{a1}$) (FIGS. 1 and 2) forming a virtual cathode 30 of spherical shape which is concentric with the center 25. Ions from the virtual anode 28 then will be accelerated inwardly toward this virtual cathode 30. By proper adjustment of the relative ion and electron currents, this virtual cathode 30 can be maintained in principle of such a small radius that it can be regarded as being located almost at the very center 25. The ions 26 traveling through this center region will be radially focused and will possess high kinetic energies. Since many of the ions are traveling on paths which intersect the center 25, they will collide, such that if deuterium and/or tritium ions are used, a large fusion rate can be produced.

Figure 2:
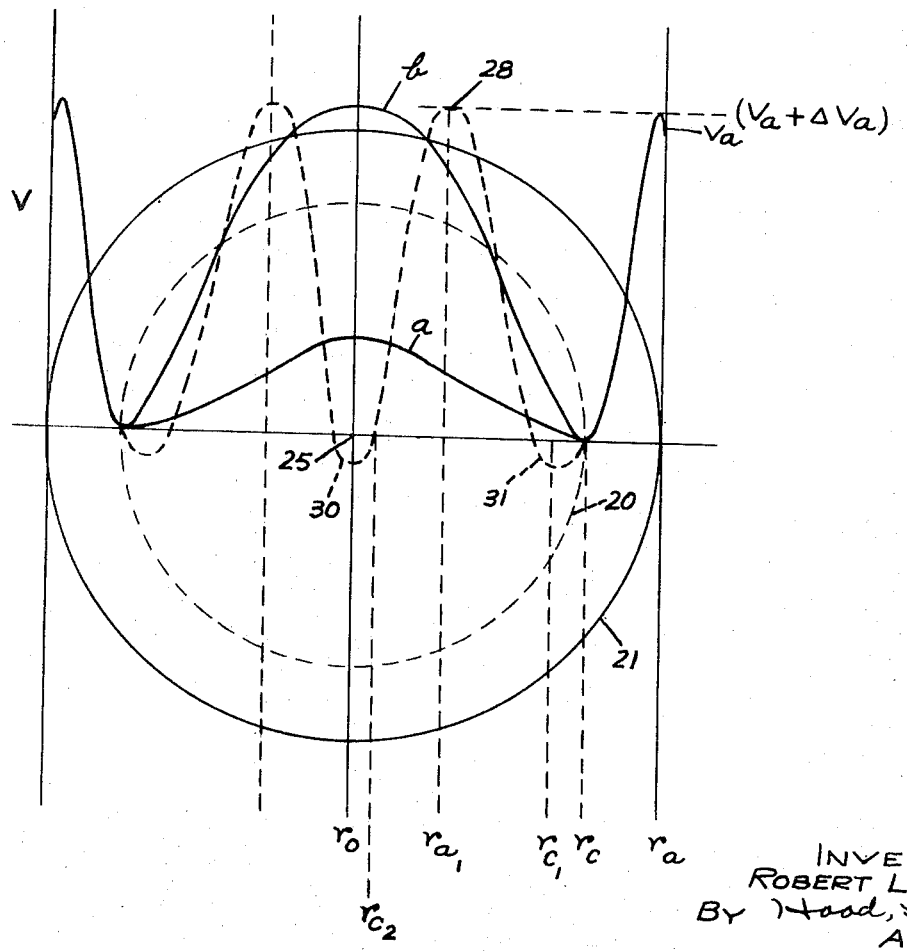
FIG. 2 is a potential distribution curve used in explaining the theory.

The establishment of the bi-polar space charge inside the cathode 20 may be better understood by reference to the graph of FIG. 2 wherein the abscissa represents the radius of the device and the ordinate the potential distribution therein. The magnitude of the space charge is dependent upon the amount of space-charge current flowing in the cathodic space. For a minute quantity of current, the positive charge contribution is small, and the potential at the center would appear as shown by curve $a$. A larger current will produce a more positive potential distribution such as curve $b$. Greater or lesser currents will change the potential at the center 25 correspondingly. If now electrons are supplied by the cathode 20, the potential gradient near the cathode 20 becomes more negative than that of the cathode 20, and the potential curve moves downwardly until it has a minimum at 31. For this condition, most of the electrons are slowed down until they come to rest, thus creating a virtual cathode, also designated by the numeral 31, adjacent to the cathode 20 and concentric therewith. Electrons flow from this virtual cathode in either direction, i.e., they either return to the cathode 20 or flow into the central cathodic volume.

Some electrons, under the attractive influence of the virtual anode 28, will be accelerated toward the center 25 until their Coulomb repulsion forces predominate. They then will be decelerated, giving up kinetic energy to the field, and ultimately may be scattered, returning to the virtual cathode 31. where they will repeat the cycle. Since the electron density is the greatest in the small spherical volume enveloping the center 25, the negative space-charge contribution by the electrons will be the greatest in that region and a potential minimum or a crater will develop in the center of the positive gradient $b$ (FIG. 2) which will increase in depth until a virtual cathode 30, with a potential equal to that of the virtual cathode 31, is created at the center 25. This action is accompanied by a displacement of the peak of the positive potential gradient to a radius $r_{a1}$ where a spherical potential sheath or virtual amode 28 (previuosly described) is formed.

As explained in detail in Farnsworth Pat. No. 3,386,-883 (application Ser. No. 549,849, filed May 13, 1966), multiple, alternating virtual anodes and cathodes may be formed. However, for the purposes of this invention, it is only necessary to consider the existence of one virtual anode and one virtual cathode already described.

The essence of the formation of the virtual electrodes is the attainment of particle trapping or confinement and high density by a forced charge separation in spherical geometry. Formation of the virtual electrodes obviously consumes power, and the bi-polar charges are the instruments used in the electrode formation. The more efficiently these instruments are used, the less power is consumed in forming and maintaining the virtual electrodes. This invention is directly concerned with these efficiencies.

The ideal structure is diagrammatically shown in FIG. 3, in which the anode 21 is considered as the source of the ions 26 which emanate from the entire spherical surface thereof. The ions are considered as following radial paths such that upon encountering the virtual anode 28, they reutrn to the anode 21 along the same paths. Each ion therefore contributes all of its energy to the formation and retention of the virtual anode 28, such that the ions 26 considered as instrumentalities are utilized with maximum efficiency.

The significance of this idealized concept is further explained in connection with FIGS. 4 through 7. In FIG. 4 is illustrated diagrammatically an embodiment in which a multiplicity of ion guns 32 are mounted on the exterior of the anode 21 and contain electrodes which form the ions into pencil-like beams 33 of solid cross-section. A portion of the beam 33 is shown in FIG. 5 and a cross-section thereof in FIG. 6. The beams 33 are focused toward the center 25, the ion guns being located in diametrically opposite pairs so that the beams thereof follow essentially common diametral paths.

The ions in the beams 33 form the virtual electrodes as previously explained, the virtual anode 28 being indicated as the terminus of the beams.

In order for all of the ions in the beams 33 to be utilized with maximum efficiency in the formation of the virtual anode 28, it is necessary that they all cosely follow radial paths. However, because of space charge spreading within the beams 33, not all of the ions follow radial paths, such that certain energy losses are encountered. This is explained in connection with FIG. 5, wherein the terminus of one beam 33 and a portion of the virtual anode 28 are shown. Near the virtual anode 28, the ions in the beam 33 slow down and stop. The higher the current in the beam 33, the greater will be the spreading of the outer ions as the beam ions decelerate. Those ions which are following precisely radial paths, as indicated by the numeral 34, will either return toward the structural anode 21 along the same radial paths or, more importantly, they can enter the region within the virtual anode 28 where they can contribute to the fusion region at the center. As shown, these radial paths 34 intersect the center 25. However, those outer ions following the paths 35 upon approaching the virtual anode 28 will have an angular momentum about the center 25. Thus, their orbital energy will reduce their radial energy, and they will be unable to surmount the potential "hill," i.e., the virtual anode 28, and they will therefore be reflected and never be able to enter the center, reaction region. They will, however, contribute their space charge to the virtual anode while near it, but they are of little or no use in forming the reacting center and represent a power loss. This phenomenon may be referred to as a case of "poor ion economy." Ion utilization as between the two embodiments of FIGS. 3 and 4 may now be contrasted, that of FIG. 3 making maximum use of all ions and that of FIG. 4 only partial use.

In a practical, working embodiment of the invention, the problem of poor ion economy is alleviated essentially by reducing the transverse electric field near the surface of the ion beam. This may be accomplished in two different ways, the first being by increasing the number of ion beams so that the current per beam is reduced, this leading to the ultimate "distributed source" arrangement of FIG. 3, and the second being to change the beam shape from that of the pencil-like arrangement of FIGS. 5 and 6 to some other shape. The first alternative has already been discussed in connection with FIG. 3. The second alternative constitutes a compromise in which the solid cross-section beam of FIG. 6 is modified to, for example, a hollow beam, such as that of FIG. 7. In considering the beam of FIG. 7, let it be assumed that the ion guns 32 of FIG. 4 all emit hollow beams which are focused precisely onto the center 25. Let it be assumed that the currents in the two beams of FIGS. 6 and 7 are equal; let it also be assumed that the cross-sectional area of the beam of FIG. 7 is much larger than that of FIG. 6. In this connection, in considering a theoretical example, let the diameter of the beam of FIG. 6 be two millimeters and the mean diameter of the beam of FIG. 7 be eight centimeters. The symbol $E_{pb}$ in FIG. 6 represents the transverse field acting on the peripheral ions causing outward spreading thereof. The symbol $E_{rb}$ in FIG. 7 and the arrows associated therewith indicate the fields transversely to the beam axis tending to spread the ions. Inasmuch as the currents in the two beams are the same and the area beam 7 is much larger than that of the beam of FIG. 6, it will follow logically that the transverse field $E_{rb}$ for the hollow beam is much less than the transverse field $E_{pb}$ for the pencil beam of FIG. 6. Let I represent the ion current in milliamperes. For the pencil beam $$J_{pb} = \frac{I}{\pi r^2_{pb}}$$

where J is the current density in ma./cm.$^2$.

For the case of the ring beam, in which the thickness is small with respect to the diameter, $J_{rb}$ is approximately equal to $$\frac{I}{d_{rb} \cdot t_{rb}}$$

where $t$ is the wall thickness of the ring beam (FIG. 7). Then, $$\frac{J_{rb}}{J_{pb}} = \frac{r^2_{pb}}{d_{rb} \cdot t_{rb}} = \frac{2^2 \text{ mm.}}{80 \times 1/2} = \frac{4}{40} = \frac{1}{10}$$

It is therefore evident that the electric field at the surface is proportional to J (current density) in the case of the ring beam and proportional to the current (I) in the case of the pencil beam. Quite obviously, transverse spreading of the ions in the case of the ring beam of FIG. 7 will be less than that of the beam of FIG. 6, such that more efficient utilization of the ions may be realized.

Carrying the foregoing analysis a step further, if it is considered that the arrangement of FIG. 3 utilizes an infinite number of beams emanating from the anode 21, the following is true:

(1) The current per beam approaches zero if it is considered that the total ion current in the arrangement of FIG. 3 is the same as that of FIG. 4, and (2) The electric field in a direction transversely of the beams of FIG. 3 also approaches zero, since the transverse fields of the various beams cancel one another: radial transit of the ions is not disturbed. This leads to 100% usefulness of all of the ions injected at the anode 21. This is important, because the principal method of energy input into the fusor is the input ion current depicted by the ions 26.

Figure 10:
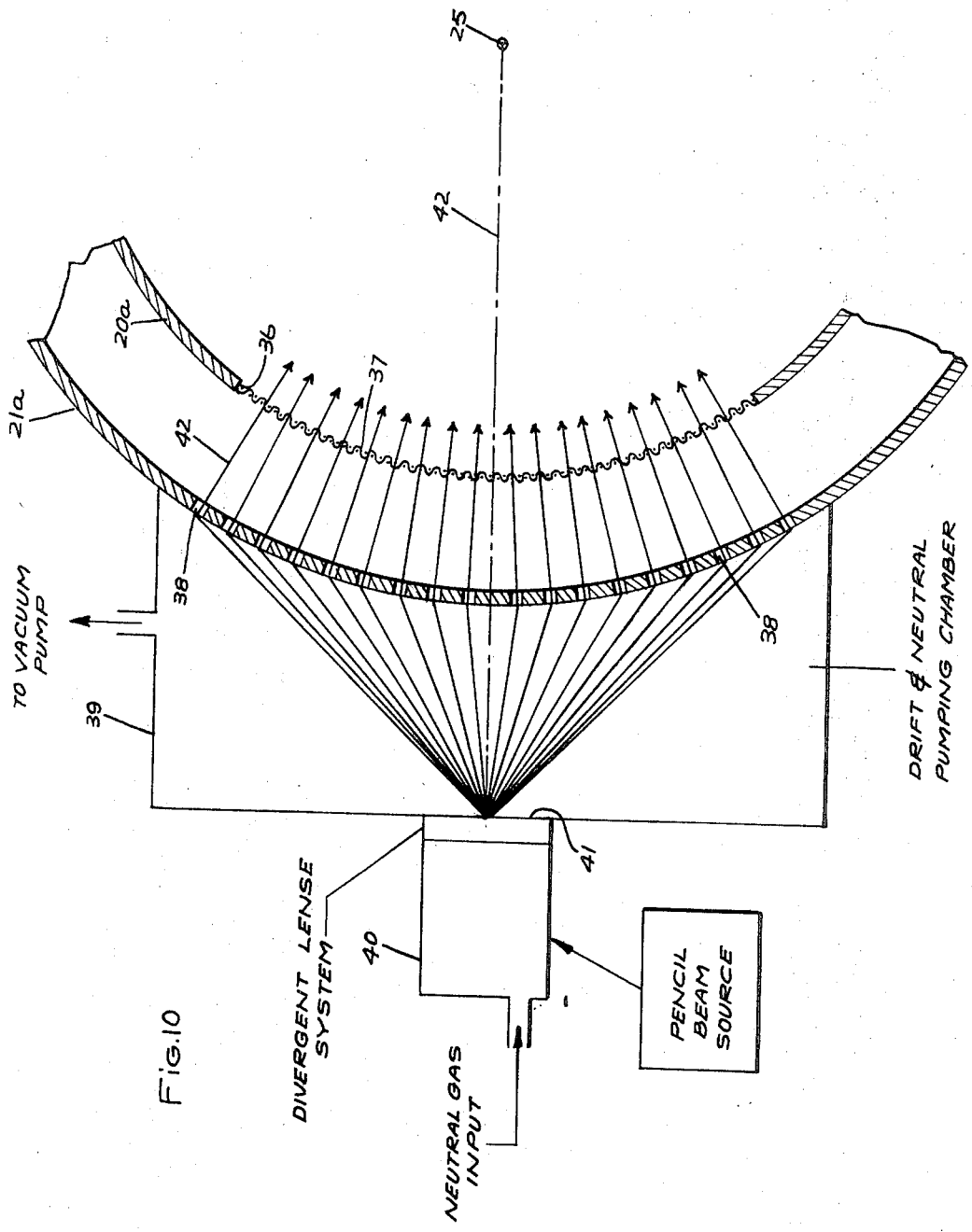
FIG. 10 is a similar sectional view of another embodiment of this invention.

In the following will be described several different, practical working embodiments of this invention, whereby the ideal conditions of ion input may be approached, thereby resulting in greater efficiencies in fusor operation. A somewhat diagrammatic illustration is shown in FIG. 10 in which a spherical cathode 20a is provided with an enlarged aperture 36 covered by a relatively large mesh screen 37 of tungsten wire. The screen 37 is formed as a spherical extension of the cathode shell 20a.

The anode shell 21a is provided with a multiplicity of relatively small apertures 38 over a large area thereof, and secured to the exterior of the anode 21a and enclosing all of the apertures 38 is a conductive envelope 39 having mounted thereon a conventional ion gun 40 capable of emitting a pencil beam like that of FIG. 6 from the end 41 along an axis 42 toward the center 25. The envelope 39 is of conductive material, preferably metal, so as to provide a drift chamber into which the ions from the gun 40 may be injected. Being conductively connected to the anode 21a, the potential on the envelope 39 will be the same as that on the anode 21a, thereby providing an equipotential space or volume into which the ions from the gun 40 may be injected. The structure of the gun 40 is arranged to be at essentially the same potential as the envelope 39, such that when the ions are injected into the envelope 39, they are injected at low velocity. As a consequence of this, substantial transverse spreading occurs as shown such that the ions spread ultimately over the entire area of the anode 21a provided with the apertures 38. By reason of the attraction of the cathode 20a, those ions which manage to enter or closely approach the apertures 38 are accelerated inwardly toward the cathode along the paths indicated by the arrows 42 and penetrate the mesh 37 in the transit toward the center 25. It will immediately be recognized that the ions passing through the various apertures 38 form low current beams, the total number of beams being spread over a relatively large area of the cathode 21a to thereby constitute a "localized distributed source" of ions. As will appear obvious from the description that preceded, lateral spreading of the ions will be kept to a minimum, thereby contributing to ion economy in the formation and maintenance of the virtual electrodes.

A different embodiment of this invention is illustrated in FIG. 11, in which a different ion-producing device is used. In this embodiment, the cathode 20b and the anode 21b may be the same as just explained in connection with FIG. 10 with the exception that a fewer number of anode apertures 38a may be used, and instead of using a screen over an opening on the cathode 20b, a series of apertures 43 may be used. As in the embodiment of FIG. 10, the apertures 38a are spread over an extended spherical area of the cathode 21b as are the apertures 43 over the area of the cathode 20b. It should be understood, of course, that all of the apertures 38a and 43 are spherically spaced in all directions about the point 25 as a center so as to cover a large portion of the spherical area on the respective electrodes.

The ion-producing device, indicated in this instance by the reference numeral 44, is disclosed in detail and claimed in Hirsch-Meeks application Ser. No. 585,901, filed Oct. 11, 1966, and entitled "Ion Gun Improvement." The disclosure of this Hirsch-Meeks application may be considered as being included herein by reference.

An hermetically sealed envelope is provided in the form of a tubular anode 45 having opposite end closures 46 and 47 as shown. The end closure 46 consists of a suitably strong metal plate sealed to the left-hand end of the anode 45 and provided with feed-through insulators 48 and 49 which mount two conductive supporting bars 50 and 51 as shown. The mounting of these supporting bars 50 and 51 within the insulators 48 and 49 is conventional and is suitably rigid for supporting thermionic cathodes 52 on the inner ends thereof. Conductively connected to the end of the bar 51 and rigidly supported thereby is a metal cup 53, annular in shape, having a flat bottom and tubular inner and outer walls. The cathodes 52 are also annular and are coaxially fitted within the cup 53 as shown. The cup 53 is coaxially mounted with respect to the anode 45 and is suitably radially spaced therefrom as shown. Its purpose is to inhibit electron motion to the rear of the chamber and to provide a degree of electrostatic focusing of the discharge.

In the end plate 46 is an opening into which is fitted a gas-inlet tube 54 leading from a suitable supply of fusion-reactive gas such as deuterium or tritium or both. A valve may be connected in series with the tube 54 for controlling manually the amount of gas flowing into the interior of the anode 45.

End closure 47 is in the form of the metal plates sealed at its perimeter to and conductively connected to anode 45 and provided with a plurality of laterally spaced apertures 55.

Clamped onto the right-hand end of anode 45 and hermetically sealed thereto is an extractor assembly indicated generally by the numeral 56. This assembly includes a metallic mounting ring 57 to which is assembled an extractor plate 58. The plate 58 is positioned in parallelism with the end plate 47 by means of a tubular member 59 of insulating material so arranged to be closed at its left-hand end by the plate 47 and on the right-hand end by the plate 58. At diametrically opposite points on the outer peripheral portion thereof, the plate 58 is engaged by two brackets 60 of insulating material which are fixedly attached to the end assembly 56. Thus, plate 58 is held rigidly in position and, furthermore, it is insulated from the anode 45. A conventional feedthrough insulator 61 is sealed hermetically to the end closure 46 and axially penetrates the entire assembly to be connected to the plate 58. This feedthrough insulator 61 includes a sleeve 62 of insulating material and a central conductor 63 conductively connected at the right-hand end to the plate 58. By means of this feedthrough insulator 61, the necessary supply voltage may be coupled to the plate 58.

As an integral part of the extractor plate 58 are a multiplicity of ion-extracting electrodes 64. Each of the electrodes 64, which is conical in shape, has an aperture 65 therein in registry with a respective aperture 55 in the plate 47. The apertures 55 and 65 are preferably arranged in two concentric circular patterns, but other patterns may be used without departing from the spirit and scope of this invention.

Fitted between the ion-producing device 44 and the spherical anode 21b is a tubular, conductive envelope 66. This envelope 66 is secured and sealed at its left-hand end to the mounting ring 57, this mounting ring being hermetically and conductively secured to the anode 45. At its right-hand end, the envelope 66 is hermetically and conductively secured to the anode 21b as shown. A pipe fitting 67 is secured to the envelope 66, and is adapted to be connected to a vacuum pump for evacuating the chamber 68 within the envelope 66. This chamber 68 is defined at its periphery by the envelope 66 and its opposite ends by the extractor plate 58 and the outer surface of the anode 21b. It should be noted that the apertures 38a are in substantial alignment with the aperture pairs 55, 65, such that parallel, straight lines drawn as shown will intersect all three apertures 55, 65, 38a.

In operation, a high voltage potential is applied to the cathode 20b and anode 21b as shown. The assembly is evacuated by operation of a suitable vacuum pump connected to the fitting 67. At the proper time, measured amounts of fusion-reactive gas are admitted into the ion-producing device 44 via the inlet line 54. Potentials are coupled to the ion-producing devices 44 as shown, a suitable filament supply being connected to the filament within cathode 52 and a biasing battery being connected between the anode 45 and the cathode circuit as shown. Thus, anode 45 is at a positive potential with respect to filament 52; however, it is at the same ground potential as anode 21b. The extractor plate 58 is biased to a negative voltage with respect to ground by means of a battery 69.

The cathode 52 being heated, it emits electrons which are attracted to anode 45. As viewed in FIG. 11, the electrons will be projected toward the aperture plate by reason of the attractive force of the field set up between the filament cup 53 and anode 45. Inasmuch as cup 53 is at the same potential as cathode 52, it will be obvious that the forces acting on the electrons emitted by the cathode will cause movement thereof.

Assuming that the space within anode 45 has been evacuated to a pressure of, for example, $10^{-7}$ torr while the valve connected to the inlet line 54 has been turned "Off," this latter valve (not shown) is opened slightly to permit gas to flow into the interior of anode 45. A pressure of greater than about $10^{-3}$ torr buildup within anode 45 constitutes one suitable operating parameter. Electrons flowing from filament 52 to anode 45 along various paths will collide with the neutral gas particles and cause ionization thereof. This results in the formation of a plasma within the space of anode 45 between filament 53 and plate 47, this space being characterized as a "plasma" chamber.

The extractor plate 58, being negative with respect to the anode 45, will provide a field which reaches into the plasma chamber and withdraws ions therefrom. Further, this field concentrates the ions through the orifices 55 and directs them through the respective apertures 65. The shape of this field is such that the ions are formed into a multiplicity of pencil-like beams having sizes and shapes corresponding to those of the respective apertures 55 and 65. Thus, the end plate 47 with its apertures 55 and the extractor plate 58 with its apertures 65 may be regarded as an ion-lens assembly which withdraws ions from the plasma chamber and forms them into a plurality of small ion beams which are accelerated along paths parallel to each other rightwardly into the evacuated chamber 68, hereafter referred to as a "drift" chamber. In a typical operating embodiment of this invention, the anode 45 may be operated within a range of from 50 to 500 volts positive with respect to the filament 52.

Some of the neutral gas admitted to the plasma chamber via the input line 54 will not be ionized and will migrate into the drift chamber 68 via the apertures 55 and 65. A vacuum pump connected to the fitting 67 is operated continuously to scavenge these neutrals from the chamber 68 for reasons which will become apparent from the later description.

Inasmuch as the chamber 68 is surrounded by walls at the same potential, the field throughout the space thereof will be cylindrically symmetric. However, by reason of the focusing effect of the extractor 58, the minute beams, now indicated by the numeral 70, emanating therefrom will follow essentially straight paths and intersect the respective apertures 38a. These beams will enter the aperture 38a at velocities depending upon the potentials applied within the chamber 44, but it is desired that they enter at a relatively low velocity. Upon entering the apertures 38a, the field between the cathode 20b and anode 21b acts thereon and provides a focusing and accelerating effect which converges all of the ions toward the center 25. The apertures 43 are disposed in radial alignment with the apertures 38a so as to receive the ions in their radial motions toward the center 25.

As explained in connection with FIG. 10, the multiplicity of low current ion beams serves in maximizing the radial motions thereof with a net improvement in efficiency in ion utilization.

Reference is now made to FIG. 12, wherein still another embodiment of this invention is illustrated in which ion motions toward the center 25 are perfected even further over those achieved by the arrangement of FIG. 11. In this FIG. 12 embodiment, the ion-producing device 44 as well as the drift chamber 68 are identical to the same assemblies and components illustrated in FIG. 11 with the exception that instead of the drift chamber 68 being contiguous to the anode 21b a "radializing" chamber 71 is interposed therebetween. As shown, the right-hand end of the drift chamber 68 is sealed off by means of a conductive wall 72 having a multiplicity of apertures 73 therein in alignment with respective aperture pairs 55, 65, previously described. Another tubular envelope, indicated by numeral 74, is secured and sealed at one end to the plate 72 and at the opposite end to the perimeter of a relatively large opening 75 in the anode 21b. Within the envelope 74 is mounted a series of circularly arranged, conductive focusing tubes 76 in juxtaposition with respect to the apertures 73, these tubes 76 having axes which are aligned substantially radially with respect to the fusor center 25. All of these tubes 76 are mounted on a metal framework 77 which is suitably anchored to the center conductors 78 of conventional insulated, stand-off connectors 79 as shown. These connectors 79 may be identical to the connectors 48 and 49 previously described. The structure should be such that the tubes 76 are positioned rigidly within the chamber 71 and furthermore are insulated from the envelope 74.

The openings 43 in the cathode 20b are arranged to be in radial alignment with the respective tubes 76 as shown. A variable voltage power supply, indicated in the form of the battery 80, is connected to one of the connectors 79 for applying a suitable potential to the tubes 76.

Operation of this embodiment of FIG. 12 is essentially the same as that described in connection with FIG. 11, with the exception that the focusing tubes 76 are biased sufficiently to direct the ion beams injected thereinto more nearly along paths which are radial toward the center 25. By adjusting the voltage on these focusing tubes 76, focusing of the beams 70a emanating therefrom may be controlled. Inasmuch as the focusing tubes 76 serve the purpose of directing the beams 70a along radial paths, the chamber 71 is characterized as a "radializing chamber."

Figure 9:
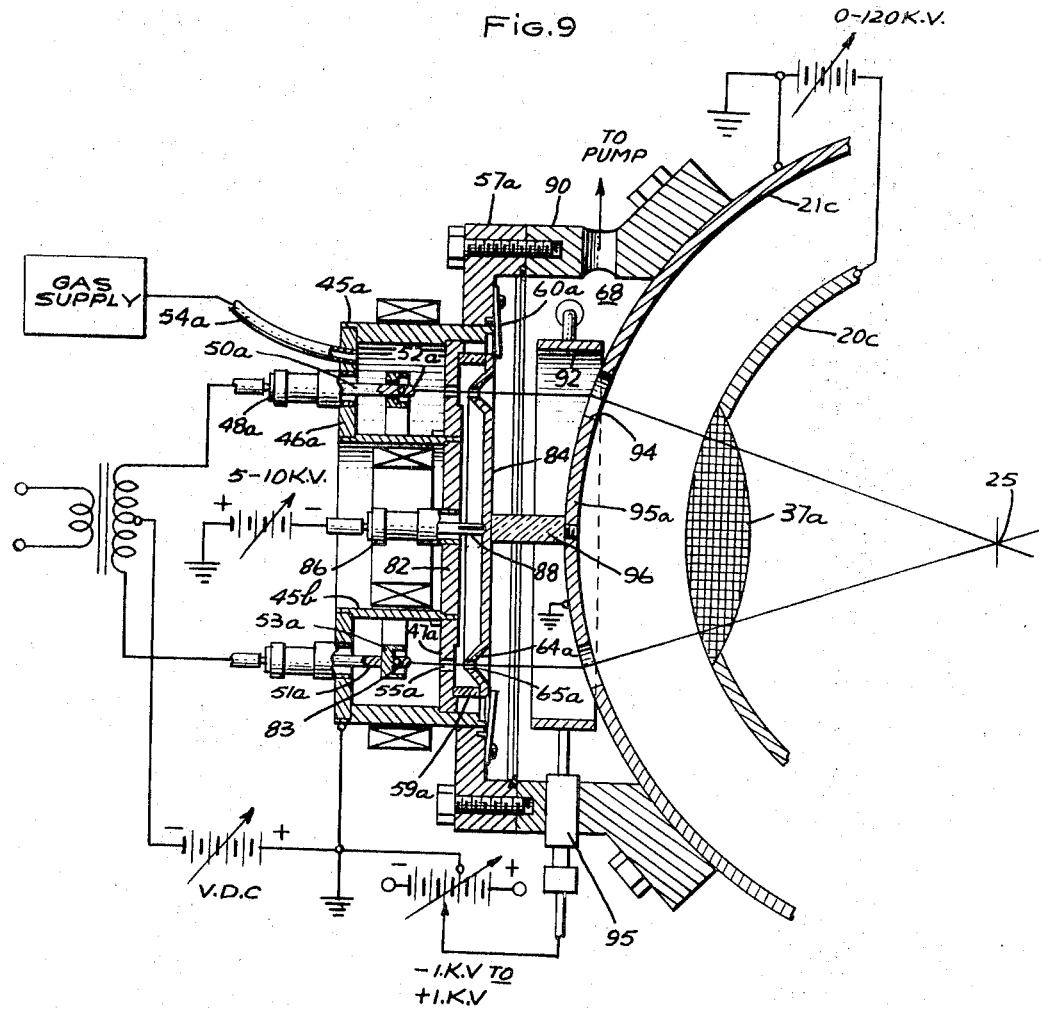
FIG. 9 is a fragmentary diametral cross-section of one working embodiment of this invention.

Referring now to FIG. 9, another embodiment for forming a hollow beam, such as that already discussed in connection with FIG. 7, is shown, the plasma chamber being annular rather than cylindrical as is true of the embodiments of FIGS. 11 and 12. Bounding this annular chamber is the anode structure which comprises an outer anode sleeve 45a and an inner anode sleeve 45b. An annular end plate 46a closes the left-hand end of the chamber while another annular end plate 47a closes the right-hand end. The plate 47a is provided with an annular orifice 55a which is coaxial with respect to all of the other structure in the assembly.

Another closure plate 82 covers the right-hand end of the anode sleeve 45b and is secured in such a manner as to provide an hermetic seal. The two plates 47a and 82 may be regarded as a single disc when considering the operation of this embodiment.

A ring cathode 52a is disposed coaxially within the chamber between the two anode sleeves 45a and 45b and furthermore is axially opposite the annular orifice 55a.

Coaxially mounted also in the assembly is a cathode cup 53a of annular shape within which the ring cathode 52a is positioned. The supporting bar 50a of the feed-through insulator 48a is directly secured conductively to ring cathode 52a as shown and passes through an enlarged hole within the cup 53a as shown to provide insulation. The other supporting bar 51a is secured directly to the bottom of cup 53a as shown and the cathode 52a in turn is secured to a small post 83 upstanding from the bottom of cup 53a for holding the cathode in position and providing a conductive connection thereto.

A flat, metal plate 84 has the extractor 64a formed therein, the latter being of annular shape and positioned in registry with respect to the orifice 55a. In a radial cross-section, the extractor 64a is triangular with an annular orifice 55a being provided in the apex thereof. The orifice 55a and aperture 65a are in axial registry, the same as is true of the preceding embodiments.

The insulating sleeve 59a is interposed between and closed by end plate 47a and the outer peripheral portion of plate 84 as shown. For securing plate 84 in position, two insulating bars 60a secured to the anode flange part 57a and clamped against 84 are used as shown.

For providing an electrical connection to plate 84, a centrally disposed feedthrough insulator 86 is used, this insulator 86 being attached to the supporting plate 82 with the center conductor 88 thereof being connected at its right-hand end to plate 84. The gas inlet tube 54a is secured to plate 46a and serves in feeding neutral gas to the plasma chamber.

A drift chamber 68 is interposed between the anode 21c and the extractor plate 84 and is bounded by a conductive tubular wall 90 of metal. The wall 90 is joined conductively to anode 21c and also to anode flange 57a as previously explained in connection with FIG. 11.

Inside the drift chamber 68 is coaxially mounted a relatively large focusing tube supported by means of feedthrough insulator 95 in the wall 90. The diameter of this focusing tube 92 is made slightly larger than the diameter of the annular orifice 65a. The feedthrough insulators 95 serve as a means of supporting rigidly the tube 92 in place yet maintain it electrically insulated from the wall 90.

Anode 21c is provided with an annular orifice 94 thereof in coaxial alignment with the orifice 65a, the mean diameter of this orifice 94 being equal to the diameter of the orifice 65a. In order to form the orifice 94, a segment 95a of the anode sphere is supported centrally by means of an insulated post 96 secured centrally to the plate 84. The segment 95a may be grounded as shown by suitable connections to either the anode 21c itself or to the anode 45a.

In operation, potentials are applied in the same manner as described previously in connection with FIG. 11, with the exception that a potential is applied to the focusing tube 92 which may be varied between the limits of $-1$ kilovolt to $+1$ kilovolt with respect to ground. Ionization occurs in the plasma chamber from which ions are extracted therefrom to the annular apertures 55a and 65a, thereby resulting in the formation of an annular or hollow ion beam. This hollow beam is directed into the drift chamber 68, where it is deflected radially inwardly toward the center 25 by reason of the focusing effects of not only the tube 92 but also the anode 21c and cathode 20c. The annular beam passes through the annular orifice 94 in the anode 21c, through the screen 37a which covers a relatively large opening in the cathode 20c toward the center 25.

Figure 8:
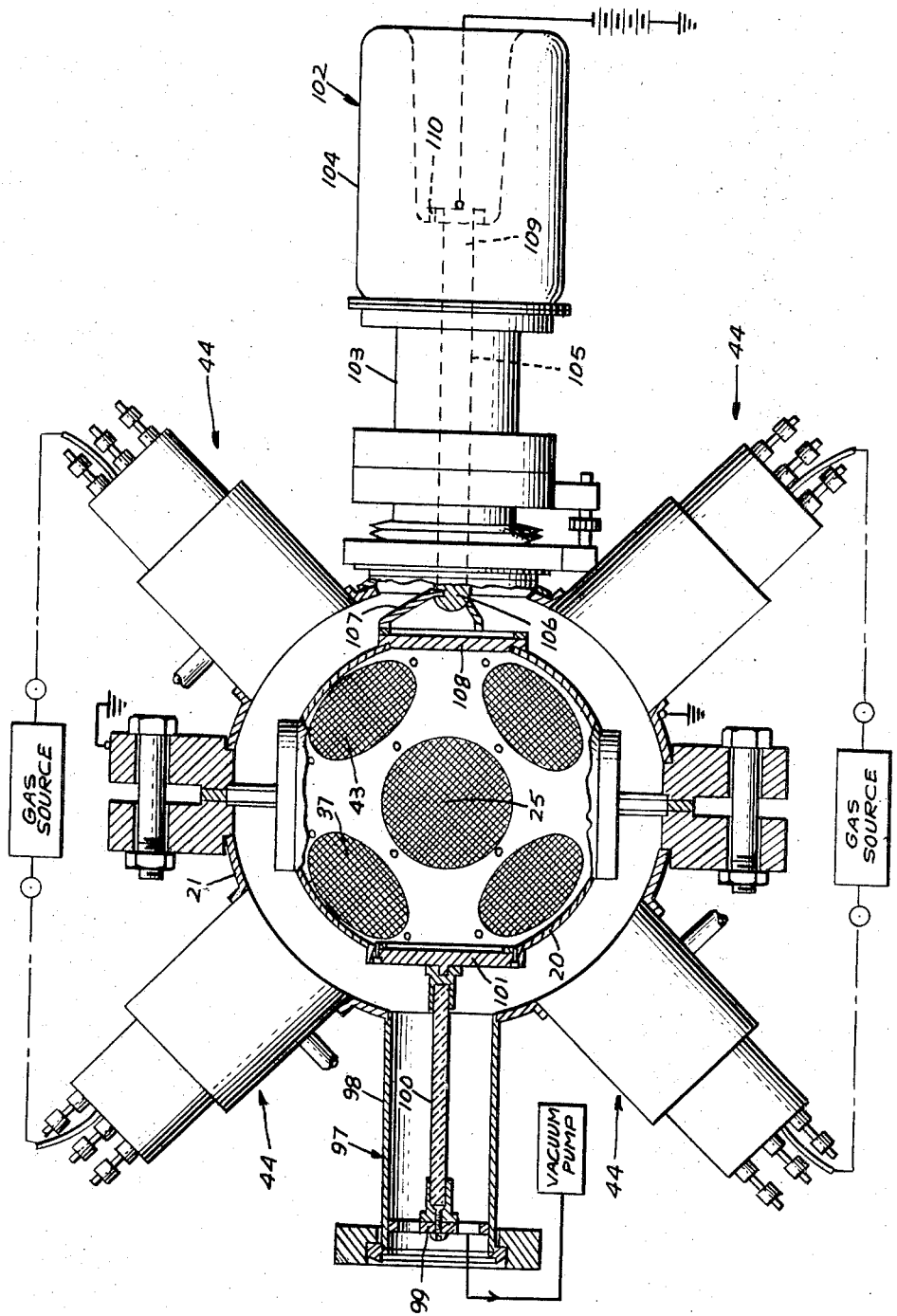
FIG. 8 is a partially sectioned illustration of an embodiment of this invention.

FIGS. 9 through 12 each illustrate what may be regarded as only one module of a complete fusor construction, a complete fusor being shown in FIG. 8. While more precisely the embodiment of FIG. 11 is used in the fusor arrangement of FIG. 8, it will be understood that any of the other arrangements of FIGS. 9, 10 and 12 may be used instead.

In the fusor of FIG. 8, eight ion-producing devices 44 are used, these being arranged in diametrically opposite pairs symmetrically around the surface of the spherical anode 21. The cathode shell 20 is mounted in concentric relation with respect to the anode 21 by means of the pedestal assembly indicated generally by the numeral 97. This assembly 97 includes a stainless steel supporting tube 98 secured at one end to the anode 21 as shown. An apertured disc 99 is fastened inside the tube 98 in the position shown and has secured thereto a ceramic post 100 which projects coaxially through the tube 98 to a position just inside the anode 21. The opposite end of the ceramic post 100 is secured to a mounting plate 101 suitably rigidly secured to the cathode shell 20. All of the parts just described are sufficiently strong and rigid to position securely the cathode 20 with respect to the anode 21.

The left-hand end of the tube 98 is adapted to have a vacuum pump connected thereto the same as has already been described in connection with the ion-producing devices 44.

A high voltage terminal assembly, indicated generally by the numeral 102, comprises a conductive tubular assembly 103 capped at its right-hand end as shown with a bottle-like insulator 104 which is sealed in vacuum-tight relation to the tubular assembly 103. Extending coaxially through the assembly 103 and the insulator 104 is a rod-like electrode 105. The inner end 106 of this electrode 105 has rigid conductors 107 connected to a mounting plate 108 secured to the cathode 20 as shown. The opposite end 109 of the electrode 105 penetrates in vacuum-sealed relation the re-entrant end wall portion 110 of the insulator 104 to have connected thereto the high voltage leads shown in the preceding figures. All of the parts are sufficiently strong and rigid as to assist in centering and securing the cathode 20 within the anode 21. The cathode 20 itself is constructed as already described in connection with the preceding embodiments, the structure comprising a spherical, metallic shell having a series of relatively large apertures therein covered by tungsten wire screen of relatively large mesh, this being illustrated in FIG. 10. Alternatively, instead of using the relatively large apertures and screen structures, the cathode shell itself may be provided with a multiplicity of beam-receiving apertures as already described in connection with FIGS. 11 and 12.

For further details regarding construction, materials, operating parameters and the like, reference may be had to the preceding Farnsworth patents, the disclosures of which being included herein by reference thereto.

Operation of the fusor of FIG. 8 is the same as previously described with the exception that during the operation, the anode cavity itself is continuously being evacuated by means of a pump connected to the tubular assembly 97. Each of the ion-producing devices 44 in association with the anode 21 and cathode 20 constitutes a "localized distributed source" of ions which are injected into the anode cavity from the outside thereof. As explained previously, this is to be contrasted with the injection of ions in the form of a pencil-like beam of solid cross-section wherein spreading of the ions due to the Coulomb forces of repulsion produces non-radial motions which detract from the efficacy of the ions in reaching the center of the fusor. Ions injected by the ion-producing devices 44 occupy a substantial circumferential area of the anode and cathode such that the lateral spreading due to the Coulomb forces of repulsion is reduced, thereby permitting the ions to more nearly follow radial paths toward the center 25 of the fusor. As explained previously, as the individual, ion beam currents approach zero, the transverse field producing lateral spreading thereof also approaches zero. By spreading the ions over a substantial area of the anode prior to low velocity injection thereinto, the individual ion beams directed toward the center 25 will be of correspondingly low current and will thereby experience less spreading than is true of the case of a high current beam of solid cross-section.

Dimensions of the anode and cathode and the operating voltages applied thereto for obtaining fusion reactions in the fusor may be the same as disclosed in the Farnsworth Pat. No. 3,386,883.

Efficiency in operation is gained by reason of the fact that the ions are produced exteriorly of the anode in a chamber where ionization efficiencies are high and the ionization process can be more closely controlled. Instead of extracting ions in the single beam form, they are formed into a relatively widely distributed and controlled series of beams of small current which are injected at low velocity into the anode shell. Such ion injection is controlled to be along paths radial of the anode and cathode. Also, such injection is accompanied by the continuous scavenging of neutral gas which is thereby prevented from entering the anode. This reduces associated loss processes inside the anode and cathode cavities which otherwise would occur by reason of collisions between the ejected ions and the neutral molecules. By maintaining background neutral gas to a minimum in the anodic and cathodic cavities and injecting the fuel ions in distributed form at the anode surface, greater efficiencies are obtained in the operation of the fusor in obtaining fusion reactions.

While there have been described above the principles of this invention in connection with specific apparatus, it is to be clearly understood that this description is made only by way of example and not as a limitation to the scope of the invention.

What is claimed is:

1. Improvements in apparatus for generating fusion reactions, comprising anode means, cathode means inside said anode means, said cathode means defining a volume centrally located with respect to both said anode and cathode means, said volume being free of tangible structure, means for applying a potential to said anode and cathode means for establishing an electric field therebetween of sufficient magnitude to impart fusion-reactive energies to positively charged particles introduced in the ticles, a drift chamber interposed between said producing space between said anode and cathode means, means external to said anode means for producing charged particles, a drift chamber interposed between said producing means and said anode means for receiving charged particles from said producing means, both said anode and cathode means having openings in registry with said drift chamber through which charged patricles may be directed from said chamber to said volume, means including said anode and cathode means for directing said charged particles from said chamber into said anode means and for focusing them toward the center of said volume, and means for scavening neutral gas from said chamber during the traversal of said charged particles.

2. The improvements of claim 1 including means for introducing neutral gas into said producing means, said producing means including means for ionizing said neutral gas and constituting a source of fusion-reactive fuel in said volume.

3. The improvements of claim 1 wherein said drift chamber is separted from the interior of said anode means by a wall having a multiplicity of apertures through which said charged particles pass, said wall constituting part of said directing and focusing means whereby charged particles in said chamber form into a multiplicity of streams which extend from said apertures toward the center of said volume.

4. The improvements of claim 1 in which said producing means includes a plasma chamber in which ions are formed, an ion-extracting electrode permeable to ions being interposed between said plasma and drift chambers, a wall permeable to ions separating said drift chamber from the interior of said anode means, said wall having an a plurality of apertures therein and constituting part of said directing and focusing means for forming a multiplicity of transversely spaced ion streams which converge from said anode means toward the center of said volume.

5. The improvements of claim 1 in which said producing means includes a plasma chamber in which ions are formed, an ion-extracting electrode permeable to ions being interposed between said plasma and drift chambers, a wall permeable to ions separating said drift chamber from the interior of said anode means, said wall having an annular aperture and constituting part of said directing and focusing means for forming a hollow ion beam which converges from said anode means toward the center of said volume.

6. The improvements of claim 4 in which said anode means is a generally spherical metallic shell concentrically surrounding said cathode means which is also a generally spherical metallic shell, said wall being a part of the shell of said anode means, and said drift chamber being defined by a conductive envelope conductively connected to said anode shell.

7. The improvements of claim 6 wherein said plasma and drift chambers constitute a source of ions for injection into said volume and including a plurality of said ion sources mounted on said anode shell.

8. The improvements of claim 7 in which each said ion-extracting electrode has a plurality of ion-transmitting orifices communicating with said drift chamber, said electrode being spaced from the wall part of said anode shell and constituting the opposite wall of said drift chamber, said walls being spaced apart in a direction radially of said anode shell.

9. The improvements of claim 8 in which each electrode is a plate-like element arranged substantially normal to the extended radius of said anode shell, the apertures in the wall part of said anode shell being equal in number to and disposed opposite from the respective ones of said orifices such that straight lines extending between respective orifices and apertures are parallel to each other and to said extended radius.

10. The improvements of claim 1 in which said producing means includes a plasma chamber in which ions are formed, an ion-extracting electrode permeable to ions being interposed between said plasma and drift chambers, an ion-radializing chamber interposed between said drift chambers and the interior of said anode means, means in said ion-radializing chamber for receiving ions from said drift chamber and directing them along paths which converge onto the center of said volume, the last-mentioned means including an ion-optical device having a plurality of ion-transmitting passage therein, said ion-radializing chamber opening into the interior of said anode means.

References Cited

UNITED STATES PATENTS

| | | | |
|---|---|---|---|
| 3,113,917 | 12/1963 | Linhart | 176—1 |
| 3,214,342 | 10/1965 | Linhart | 176—1 |
| 3,243,348 | 3/1966 | Hansen et al. | 176—1 |
| 3,258,402 | 6/1966 | Farnsworth | 176—1 |
| 3,386,883 | 6/1968 | Farnsworth | 176—1 |

REUBEN EPSTEIN, Primary Examiner

U.S. Cl. X.R.

176—5, 8; 313—61, 161; 315—111